United States Patent
Carrizales

(10) Patent No.: US 11,152,852 B2
(45) Date of Patent: Oct. 19, 2021

(54) BIDIRECTIONAL DC/DC CONVERTER AND METHOD FOR CHARGING THE INTERMEDIATE CIRCUIT CAPACITOR OF A DC/DC CONVERTER FROM THE LOW-VOLTAGE BATTERY

(71) Applicant: Robert Bosch GmbH, Stuttgart (DE)

(72) Inventor: Emiliano Gudino Carrizales, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 525 days.

(21) Appl. No.: 16/071,834

(22) PCT Filed: Dec. 9, 2016

(86) PCT No.: PCT/EP2016/080456
§ 371 (c)(1),
(2) Date: Jul. 20, 2018

(87) PCT Pub. No.: WO2017/125204
PCT Pub. Date: Jul. 27, 2017

(65) Prior Publication Data
US 2019/0027950 A1    Jan. 24, 2019

(30) Foreign Application Priority Data

Jan. 20, 2016    (DE) ...................... 10 2016 200 662.2

(51) Int. Cl.
*H02M 1/36*       (2007.01)
*H02M 3/335*     (2006.01)
(Continued)

(52) U.S. Cl.
CPC ............ *H02M 1/36* (2013.01); *B60L 3/0046* (2013.01); *B60L 58/20* (2019.02); *H02J 7/342* (2020.01);
(Continued)

(58) Field of Classification Search
CPC ....... H02J 2207/20; H02J 7/342; B60L 58/20; B60L 2210/10; Y02T 10/7005;
(Continued)

(56) References Cited

U.S. PATENT DOCUMENTS

| | | | |
|---|---|---|---|
| 5,815,386 A | * | 9/1998 | Gordon .................... H02M 1/34 363/50 |
| 2001/0011880 A1 | * | 8/2001 | James .................. H02M 1/4208 320/104 |

(Continued)

FOREIGN PATENT DOCUMENTS

| | | |
|---|---|---|
| DE | 102014205652 A1 | 10/2015 |
| EP | 1677410 A1 | 7/2006 |

(Continued)

OTHER PUBLICATIONS

International Search Report with English translation and Written Opinion for Application No. PCT/EP2016/080456 dated Mar. 14, 2017 (10 pages).

*Primary Examiner* — Richard Isla
*Assistant Examiner* — Johali A Torres Ruiz
(74) *Attorney, Agent, or Firm* — Michael Best & Friedrich LLP

(57) ABSTRACT

The invention relates to a bidirectional DC/DC converter for transmitting energy between a high-voltage grid (HV) and a low-voltage grid (LV), comprising connections for a high-voltage battery ($U_{HV}$) and a low-voltage battery ($U_{NV}$). The converter comprises the following:—one or more transformers (1) for galvanically isolating the low-voltage grid (LV) from the high-voltage grid (HV), an intermediate circuit capacitor ($C_{ZK}$) in the high-voltage grid (HV),—electronic switches ($D_1$ to $D_4$, $M_1$ to $M_4$) for connecting and reversing the polarity of the coil of the transformer (1) on the high-voltage grid (HV) and on the low-voltage grid (LV),—a controller (2) for controlling the electronic switches ($D_1$ to (Continued)

$D_4$),—and a series inductance ($W_1$) in the low-voltage grid (NV). The series inductance ($W_1$) is designed as a discharge transformer (3) for discharging the energy stored in the series inductance ($W_1$), wherein a second coil ($W_2$) is connected in series to a discharge switch (S) and a diode (D), and the series inductance ($W_1$) is discharged to the low-voltage battery (UNV) when the discharge switch (S) is activated. The invention additionally relates to a method for charging the intermediate circuit capacitor ($C_{ZK}$) of the converter to the high-voltage grid potential from the low-voltage battery ($U_{NV}$).

11 Claims, 3 Drawing Sheets

(51) Int. Cl.
*H02M 3/337* (2006.01)
*B60L 3/00* (2019.01)
*B60L 58/20* (2019.01)
*H02J 7/34* (2006.01)
*H02M 1/32* (2007.01)

(52) U.S. Cl.
CPC ..... *H02M 3/3376* (2013.01); *H02M 3/33584* (2013.01); *B60L 2210/10* (2013.01); *H02J 2207/20* (2020.01); *H02M 1/322* (2021.05); *Y02T 10/70* (2013.01); *Y02T 10/72* (2013.01)

(58) Field of Classification Search
CPC ..... Y02T 10/70; Y02T 10/72; Y02T 10/7066; Y02T 10/7216; H02M 1/36; H02M 3/33584; H02M 3/3376
See application file for complete search history.

(56) References Cited

U.S. PATENT DOCUMENTS

| | | | | |
|---|---|---|---|---|
| 2002/0044459 A1* | 4/2002 | Tsubota | ................. | H02M 1/34 363/16 |
| 2003/0002304 A1* | 1/2003 | Zhu | ................. | H02M 3/337 363/56.02 |
| 2006/0274558 A1* | 12/2006 | Keung | ................. | H02M 3/158 363/21.02 |
| 2015/0221432 A1* | 8/2015 | Zhou | ................. | H01F 27/40 361/679.01 |
| 2015/0372606 A1* | 12/2015 | Tamura | ................. | H02M 3/33584 363/21.04 |
| 2016/0056726 A1* | 2/2016 | Sander | ................. | H02M 3/33546 363/21.04 |

FOREIGN PATENT DOCUMENTS

| | | |
|---|---|---|
| EP | 1801960 A2 | 6/2007 |
| EP | 2445747 A1 | 5/2012 |

* cited by examiner

BIDIRECTIONAL DC/DC CONVERTER AND METHOD FOR CHARGING THE INTERMEDIATE CIRCUIT CAPACITOR OF A DC/DC CONVERTER FROM THE LOW-VOLTAGE BATTERY

BACKGROUND OF THE INVENTION

The present invention relates to a bidirectional DC/DC converter which comprises an augmentation which enables charging the intermediate-circuit capacitor to the voltage of the high-voltage network using electrical energy from the low-voltage battery, and the present invention also comprises a method for charging the intermediate-circuit capacitor via this converter.

DC/DC converters are supplied by a DC voltage source and provide the consumer with the electrical energy in the form of DC voltage at a different voltage level. The terms high-voltage network and low-voltage network are used here.

For example, the drive motor of electric or hybrid vehicles is driven by the high-voltage network at a voltage of several hundred volts, while the low-voltage vehicle electrical system generally has a voltage of 12 volts or occasionally 24 or 48 volts. Both networks have a respective battery and are interconnected via a DC/DC converter, which contributes to the stability of the overall system. The low-voltage battery is periodically charged from the high-voltage network via the DC/DC converter, by means of the alternator, similarly to the battery in a passenger vehicle having an internal combustion engine. However, the high-voltage battery must be periodically charged or possibly exchanged at filling stations.

In certain repair and maintenance situations, the high-voltage battery must be disconnected, and the high-voltage network must be at zero potential; thus, in particular the intermediate-circuit capacitor which is connected in parallel with the high-voltage battery must be discharged.

If the high-voltage battery were to be spontaneously reconnected to the high-voltage network, potentially high and rapidly increasing currents would flow in particular due to the recharging of the intermediate-circuit capacitor. In the prior art, a device is therefore provided for charging the intermediate-circuit capacitor with energy from the battery which is to be connected. This charging device comprises an ohmic resistor and a mechanical switch. After activating the switch, charging current flows via the charging resistor to the intermediate-circuit capacitor, and the main connection of the battery to the intermediate-circuit capacitor can be connected only when said capacitor is charged, said connection bypassing the charging resistor.

SUMMARY OF THE INVENTION

A first aspect of the present invention is directed to the hardware-based switching of the converter. The DC/DC converter according to the present invention for transmitting energy between a high-voltage network (HV) and a low-voltage network (LV) comprises terminals for a high-voltage battery and a low-voltage battery, and an intermediate-circuit capacitor in the high-voltage network. One or more transformers ensure the galvanic isolation of the low-voltage network from the high-voltage network, in such a way that energy transmission takes place only via the inductive coupling between the transformer coils. The transformer coils may be supplied with current pulses from the corresponding battery on the respective side delivering energy, in that diodes configured as electronic switches connect them to the battery by means of a control device at high frequency (several kHz) and reverse their polarity. On the energy-receiving side, diodes generally function passively as rectifiers for the transmitted current pulses (synchronous rectifiers); here, however, if the DC/DC converter is able to function bidirectionally, such diodes must be used which can also be switched as needed.

In normal operation, i.e., when transmitting energy from the high-voltage circuit to the low-voltage circuit, a series inductor in the low-voltage network is used to smooth the current pulses in the low-voltage circuit.

In order now to be able to charge the intermediate-circuit capacitor in the high-voltage circuit from the battery in the low-voltage circuit in a controlled and current-limited manner, this series inductor is configured as a discharge transformer, wherein the term discharge transformer refers to the inductive discharging of the energy stored in the series inductor. Thus, a second winding of the discharge transformer is provided, which is connected in series with a discharge switch and a discharge diode, and if the discharge switch is activated, this winding is connected to the low-voltage network and can transmit energy back to it from the series inductor, wherein the discharge diode allows the current to flow only in the direction of the low-voltage battery.

A DC/DC converter thus augmented has the advantage that a charging circuit is no longer needed for charging the intermediate-circuit capacitor from the battery of the high-voltage circuit, which in particular makes an additional, complex mechanical switch in the high-voltage region necessary; but rather, the intermediate-circuit capacitor may be charged to its setpoint value, starting from the voltage of zero, by suitably controlling the switches in the low-voltage circuit of the converter, before the battery of the high-voltage circuit is connected. The losses, which otherwise arise in the charging resistor of a charging circuit according to the prior art, are also eliminated, thus increasing the efficiency.

However, for other use cases as well, for example, for certain functional tests, a DC/DC converter modified in such a way may charge the intermediate-circuit capacitor in the high-voltage circuit to any desired voltage while the high-voltage battery is disconnected, from the battery in the low-voltage circuit.

Specific embodiments of the converter provide additional advantages.

The DC/DC converter, in which the series inductor is augmented by the second winding to form a discharge transformer, may be a forward converter or a flyback converter having galvanic isolation from the high and low-voltage circuits, and having a current-fed intermediate circuit. For example, said converter may be a single-phase or multiphase full-bridge phase-shifted (FBPS) converter, a push-pull converter, or a multilevel converter. In particular, the transformer, the switches, and the control unit may also be wired and operated in such a way that the converter is configured as a single-phase full-bridge phase-shifted (FBPS) DC/DC converter for hybrid and electric vehicles.

One advantage of the present invention that it may be used universally in all these converter types.

The second winding of the discharge transformer and the discharge diode are biased in such a way that, if the discharge switch is activated, a current in the series inductor which induces a voltage which is opposite the low voltage may be discharged via the second winding into the low-voltage battery, wherein the current is rectified via the discharge diode.

One or a plurality of damping capacitors which are connected in parallel with the low-voltage battery, and a series circuit which comprises a damping resistor and a damping capacitor and which is connected in parallel to the series circuit comprising a series inductor and a low-voltage battery, are used for the advantageous smoothing of voltage spikes during the switching operations in the low-voltage region.

A second aspect of the present invention relates to the method for charging the intermediate-circuit capacitor with energy from the low-voltage battery. This takes place via a sequence of controlled current pulses in two phases:

In the first phase, there are initially short current pulses respectively having a correspondingly long subsequent dead time, during which the low-voltage battery is disconnected from the transformer. The current pulses become continuously longer and the idle times become shorter, and the intermediate-circuit capacitor thus charges until the dead time of zero has been reached. In this phase, the series inductor is discharged during the respective dead time via its second winding.

In the second phase, the current pulses flowing through the low-voltage transformer winding are gradually shortened again, wherein the diodes in the low-voltage network are switched to the conductive state during the intermediate intervals. As a result, the transformer winding in the low-voltage network is short-circuited. These short-circuit intervals become longer. However, the discharge switch is now open, so that the series inductor, which is directly adjacent to the low-voltage battery during the short-circuit period, can recharge, and can thus provide for an ever-higher induction voltage at the intermediate-circuit capacitor during the next pulse, until the desired setpoint value has been reached.

The advantage here is that in this boost mode, the intermediate-circuit capacitor can be charged to practically any desired voltage. The charging speed, i.e., the average charging current in the intermediate-circuit capacitor, is determined by how rapidly the charging pulses in lengthen in the first phase and shorten in the second phase. Thus, the time profile of the charging current may be specified arbitrarily.

The method for charging the intermediate-circuit capacitor comprises the following individual steps:
  closing the discharge switch;
  supplying the low-voltage side of the transformer with alternating pulses of increasing width, wherein the switches for the low-voltage winding of the transformer are open during the dead times between the pulses;
  determining that the dead time of zero has been reached, opening the discharge switch;
  supplying the low-voltage winding of the transformer with alternating pulses, of which the width decreases, wherein during the short-circuit intervals between the pulses, the low-voltage winding of the transformer is short-circuited by the switches, and the low-voltage battery supplies the series inductor; and
  ending the charging operation when the intermediate-circuit capacitor is charged to the desired voltage.

The energy stored in the series inductor is not wasted, but is returned to the low-voltage battery, thus having an advantageous effect on the energy balance of the charging operation.

It is also advantageous if the control device is able to work with pulses having a fixed frequency.

DETAILED DESCRIPTION

Figure 1:
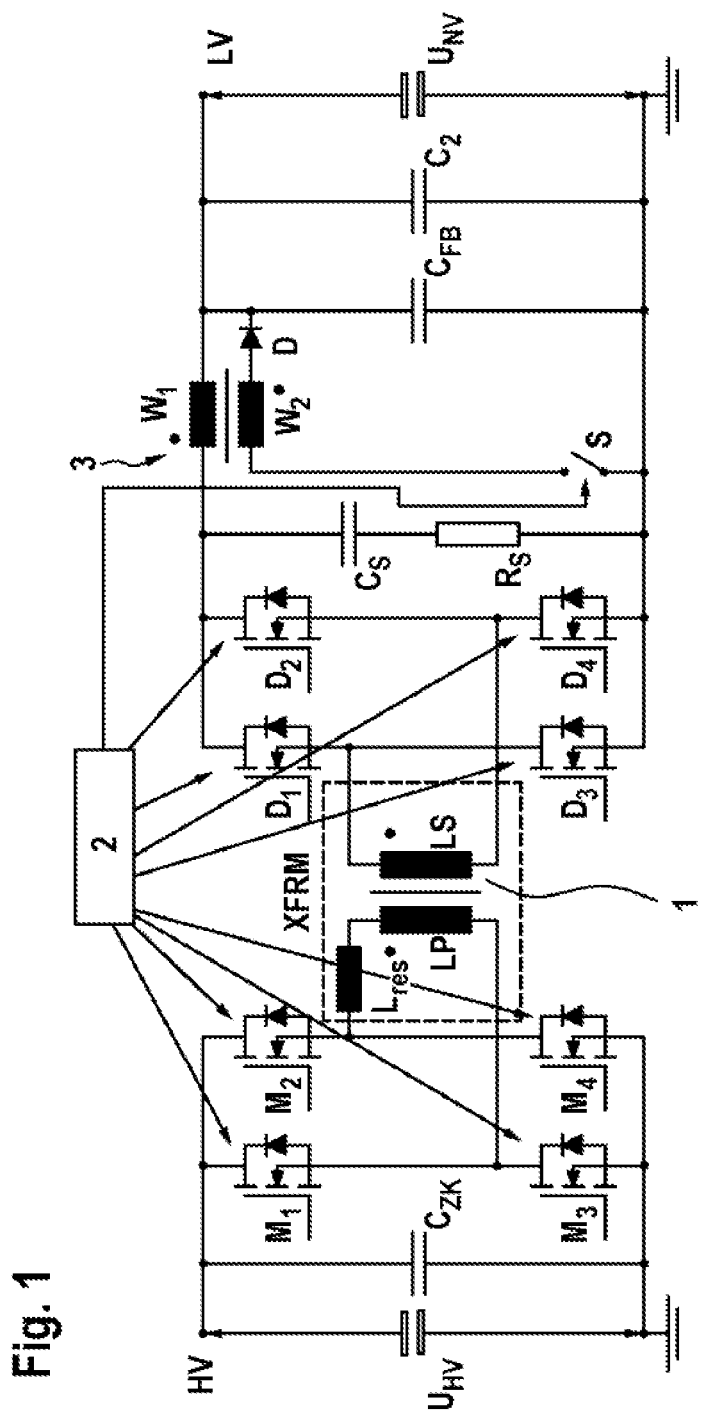
FIG. 1 shows the circuit of a single-phase full-bridge phase-shifted (FBPS) DC/DC converter comprising the augmentations provided for charging the intermediate-circuit capacitor.

FIG. 1 shows the circuit of a single-phase full-bridge phase-shifted (FBPS) DC/DC converter, which is one possible type of converter in which it is possible to charge the intermediate-circuit capacitor $C_{ZK}$ from the low-voltage battery $U_{NV}$, starting from the voltage of zero volts, via modifications which will be described in detail below. However, the modifications may be used on any forward converter having galvanic isolation and a current-fed high-voltage intermediate circuit, for example, with push-pull converters or multilevel converters.

The FBPS converter depicted in FIG. 1 comprises a transformer 1 which, in normal operation, is fed by the high-voltage battery $U_{HV}$ which is connected to the terminal HV. Switches $M_1$ to $M_4$ switch this voltage at a clock frequency of several kHz, with alternating signs, to the primary winding of the transformer 1, whereby its core, alternating periodically, is magnetically charged. Thus, by means of a control device 2, the switches $M_1$ and $M_4$ are switched to the conductive state at the start of the first half period, and the switches $M_2$ and $M_3$ are switched to the conductive state at the start of the second half period. The transmitted power is controlled in that the switches which are switched to the conductive state turn off after just a portion of the half period; the pulse width to be specified by the controller 2 is thus a measure of the energy flow, and by influencing this parameter, the transmitted power may be correspondingly controlled or regulated according to the current requirement in the low-voltage circuit. The resonant coil $L_{res}$ provides for smooth switching of the switches, so that their switching power loss is minimized.

In the secondary of the transformer 1, the low-voltage region, an induction voltage is generated which is rectified by the passive diodes $D_1$ to $D_4$. The induction surge is conducted via the series inductor $W_1$ to the capacitor $C_2$ and the terminals LV, to which the low-voltage battery $U_{NV}$ and the consumers of the low-voltage circuit are connected. Here, the series inductor $W_1$ and the capacitor $C_2$ are used for smoothing voltage spikes during the switching operations. During normal operation, the FBPS converter functions as a step-down converter.

It is to be noted here that the components $M_1$ to $M_4$ on the high-voltage side, and $D_1$ to $D_4$ on the low-voltage side, are referred to as "diodes" as well as "switches," depending on whether it more important that, in the instantaneous functioning of the circuit, the transition between the conductive and the non-conductive state is passively determined by the sign of the applied voltage, or that this transition is specified by the control device 2 via active switching at particular instants. However, the two terms are always to be understood to mean the same components.

In certain repair and maintenance situations, for example, in an electric or hybrid vehicle, the high-voltage battery $U_{HV}$ must be disconnected, and the high-voltage network HV must be at zero potential; thus, in particular the intermediate-circuit capacitor $C_{ZK}$ must be discharged.

If the high-voltage battery $U_{HV}$ were later to be spontaneously reconnected to the high-voltage network, currents would flow, in particular due to the recharging of the intermediate-circuit capacitor $C_{ZK}$, which are so high and which increase so rapidly that the permissible values of at least some components would be exceeded, thereby putting these components at risk.

The converter described thus far, which is essentially configured symmetrically with respect to its input and output, is now to be modified in such a way that it functions bidirectionally and, as a step-up converter, is capable of charging the intermediate-circuit capacitor $C_{ZK}$ with energy from the low-voltage battery $U_{NV}$. Thus, a special charging device becomes superfluous, which, in the prior art, transmits energy for this purpose from the high-voltage battery $U_{HV}$ which is to be connected, to the intermediate-circuit capacitor $C_{ZK}$.

Thus, the diodes $D_1$ to $D_4$ on the low-voltage side can no longer be passive rectifiers, but rather, they are activated and deactivated as switches under the control of the control device 2. On the other hand, during the charging of the intermediate-circuit capacitor $C_{ZK}$, the switches $M_1$ to $M_4$ in the high-voltage circuit are now passive rectifiers, i.e., at the applied voltage of zero, they change from the conductive state to the non-conductive state. In addition, the following modifications to the circuit are necessary, in combination with a control strategy for the switches $D_1$ to $D_4$, which is also described.

In a first phase of the charging of the intermediate-circuit capacitor $C_{ZK}$, the switches $D_1$ to $D_4$ are initially controlled on the low-voltage side in such a way that a sequence of current pulses which are initially very narrow, and which then become ever wider, is sent to the transformer 1. In the intermediate dead times which become gradually shorter, the switches $D_1$ to $D_4$ are non-conducting; thus, no current flows through them. The pulse width is increased until the dead time of zero has been reached. Until then, the converter still functions as a step-down converter.

If the switches $D_1$ and $D_4$, or respectively $D_2$ and $D_3$, switch to the conductive state in the first phase, energy is not only transferred to the transformer 1 and thus to the intermediate-circuit capacitor $C_{ZK}$, the series inductor $W_1$ is also charged. When switching off the current flow, high voltage peaks would arise which are harmful to the circuit. In order to avoid this, the series inductor $W_1$ now comprises a second winding $W_2$, which can discharge the energy in the shared core of $W_1$ and $W_2$ into the low-voltage battery $U_{NV}$. During the dead time, an increasing voltage is induced in the winding $W_2$. A discharge diode D is connected in series with the winding $W_2$, and is biased in such a way that it becomes conductive due to this voltage if the induction voltage exceeds the voltage of the low-voltage battery. Thus, a reverse flow of the energy from the series inductor $W_1$ back into the low-voltage battery $U_{NV}$ is made possible. The level of the reverse current is a function of the level of the charging current, of $W_1$, and of the transformation ratio, i.e., the winding ratio between $W_1$ and $W_2$.

The series inductor $W_1$ and the second winding $W_2$ may be implemented using conventional technology, i.e., wired or integrated into a printed circuit board using planar technology.

Discharging the series inductor $W_1$ is necessary only in this first phase of the charging of the intermediate-circuit capacitor $C_{ZK}$. Therefore, a discharge switch S is provided which is connected in series with the second winding $W_2$, and which is closed via the control device 2 only for the duration of this first phase; in all other operating states of the converter, the discharge switch S is open, and the modification of the circuit via the second winding $W_2$ and the discharge diode D thus has no effect.

The first phase of the charging of the intermediate-circuit capacitor $C_{ZK}$ ends when the current pulses have become so wide that the dead time of zero ($t_T$=0) has been reached. Since the number of windings of the transformer 1 must remain unchanged, the voltage delivered by the transformer 1 to the intermediate-circuit capacitor $C_{ZK}$ must subsequently be increased again in another manner. This occurs in that, in the second phase, the current pulses flowing through the low-voltage winding of the transformer are now again gradually shortened, wherein, however, for the respective remainder of the half period, the switches $D_1$ to $D_4$ are not turned off via the switching arrangement, but rather are switched to the conductive state. As a result, the low-voltage side winding of the transformer 1 is short-circuited, so that these intervals may be now referred to as short-circuit intervals $t_K$.

However, by no means do the switching pulses cause a short circuit of the low-voltage battery $U_{NV}$, since such a short circuit is prevented by the series inductor $W_1$. During the short-circuit intervals $t_K$, the series inductor $W_1$ is connected to the low-voltage battery $U_{NV}$ and is charged inductively. In the next switching operation, in which one of the diagonal switch pairs ($D_1$ and $D_4$ or respectively $D_2$ and $D_3$) is again turned off, the low-voltage side of the transformer 1 is connected to a series circuit comprising the low-voltage battery $U_{NV}$ and the series inductor $W_1$, in such a way that their voltages add up. By means of the additional voltage from the series inductor $W_1$, the intermediate-circuit capacitor $C_{ZK}$ may therefore be charged with a further increasing voltage; thus, in this second phase, the series inductor $W_1$ does not discharge into the low-voltage battery $U_{NV}$ as in the first phase, but rather, because of the open switch S, it discharges only into the transformer 1 and thus into the intermediate-circuit capacitor $C_{ZK}$.

The longer the short-circuit interval $t_K$ lasts in comparison to the charging pulse, the higher the charging voltages which are achievable at the intermediate-circuit capacitor $C_{ZK}$. The charging pulses are therefore shortened and the short-circuit intervals $t_K$ are lengthened until the intermediate-circuit capacitor $C_{ZK}$ is charged to the desired voltage.

The circuit depicted in FIG. 1 shows other modifications for the reliable operation of the DC/DC converter when charging the intermediate-circuit capacitor $C_{ZK}$. The series circuit comprising a damping capacitor $C_S$ and a damping resistor $R_S$ is provided in parallel with the series circuit comprising a series inductor $W_1$ and a low-voltage battery $U_{NV}$. These components smooth voltage spikes during the switching operations with the low-voltage side switches $D_1$ to $D_4$. Other damping capacitors C are connected in parallel with the low-voltage battery $U_{NV}$.

Figure 2:
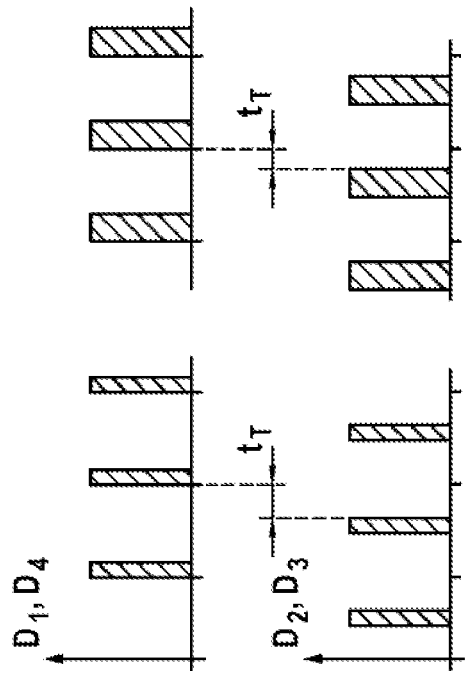
FIG. 2 illustrates the pulse sequence for charging the intermediate-circuit capacitor.

FIG. 2 illustrates the strategy for controlling the switches $D_1$ to $D_4$, which results in the desired pulse sequence for charging the intermediate-circuit capacitor $C_{ZK}$. The sequence begins in the first phase with short pulses according to FIG. 2a, and with a longer subsequent dead time $t_T$. Towards the end of the first phase (FIG. 2b), the pulses are wide, and the dead times are correspondingly shorter.

In the second phase (FIGS. 2c and 2d), intervals in which the switches are switched to the conductive state are further depicted as boxes with solid lines. However, these intervals are now longer than a half period. However, effective pulses which are able to load the transformer 1 cannot be formed if $D_1$ and $D_4$ are conductive at the same time as $D_2$ and $D_3$, since the low-voltage side transformer winding is short-circuited during these short-circuit intervals $t_K$. The remaining intervals which depict the effective pulses are depicted in FIGS. 2c and 2d as shaded. These pulses are still long at the start of the second phase (FIG. 2c), and the series inductor $W_1$ is charged during the short-circuit intervals $t_K$, which are initially still brief.

Towards the end of the second phase (FIG. 2d), the switches $D_1$ to $D_4$ are now switched to the conductive state for a longer time (also depicted here as a solid rectangle). Now, however, the effective charging pulses (shaded areas) are still short, because the increasing overlap of the switch-on times of $D_1$ and $D_4$ on the one hand, and $D_2$ and $D_3$ on the other hand, results in longer short-circuit intervals $t_K$ and shorter effective pulses. As a result of the longer short-circuit intervals $t_K$, the series inductor $W_1$ is now charged with an ever-high current, and the targeted high-voltage level is thereby finally reached at the intermediate-circuit capacitor $C_{ZK}$.

Figure 3:
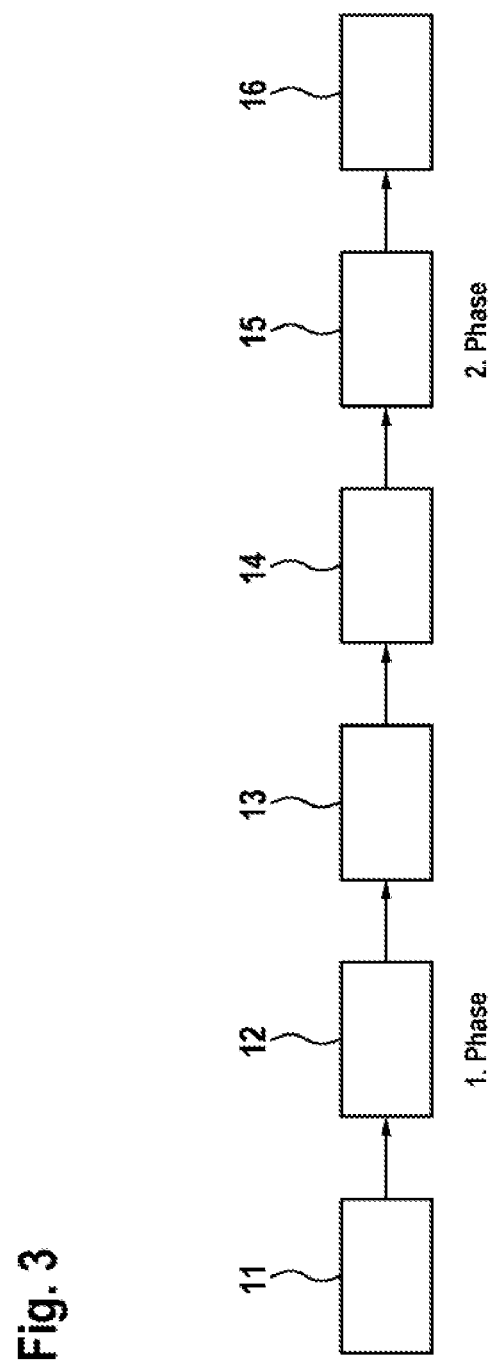
FIG. 3 schematically depicts the steps which must be implemented by the control device for charging the intermediate-circuit capacitor.

FIG. 3 symbolically depicts the method steps which are to be implemented by the control device 2 for charging the intermediate-circuit capacitor $C_{ZK}$ in the high-voltage network of the DC/DC converter:

closing (11) the discharge switch S at the start of the first phase;

supplying (12) the low-voltage side of the transformer 1 with alternating pulses of increasing width, wherein during the dead times $t_T$ between the pulses, the switches $D_1$ to $D_4$ of the low-voltage winding of the transformer 1 are open;

determining (13) that the dead time $t_T$ has reached zero;

opening (14) the discharge switch S at the start of the second phase;

supplying (15) the low-voltage side of the transformer 1 with alternating pulses, the width of which decreases, wherein during the short-circuit intervals $t_K$ between the pulses, the low-voltage winding of the transformer 1 is short-circuited by the switches $D_1$ to $D_4$, and the low-voltage battery $U_{NV}$ supplies the inductor $W_1$; and ending (16) the charging operation when the intermediate-circuit capacitor $C_{ZK}$ is charged to the desired voltage.

Preferably, the control device functions for the switches $D_1$ to $D_4$ at a fixed frequency. This means that in the first phase, the sum of the pulse length and dead time ($t_T$) remains constant, and in the second phase, the sum of the pulse length and the short-circuit interval ($t_K$) remains constant.

The invention claimed is:

1. A bidirectional DC/DC converter for transmitting energy between a high-voltage network (HV) and a low-voltage network (LV), the bidirectional DC/DC converter comprising:

terminals for a high-voltage battery ($U_{HV}$) and a low-voltage battery ($U_{NV}$), one or a plurality of transformers (1) for galvanically isolating the low-voltage network (LV) from the high-voltage network (HV), an intermediate-circuit capacitor ($C_{ZK}$) in the high-voltage network (HV), electronic switches ($D_1$ to $D_4$, $M_1$ to $M_4$) for connecting and reversing the polarity of the winding of the transformer (1) on the high-voltage network (HV) and on the low-voltage network (LV), a control device (2) for controlling the electronic switches ($D_1$ to $D_4$, $M_1$ to $M_4$);

a low-voltage side series inductor ($W_1$); and a second winding ($W_2$) connected in series with a discharge switch (S) and a discharge diode (D), and selectively connected to the low voltage network (LV) by the discharge switch (S), wherein the series inductor ($W_1$) and the second winding ($W_2$) are configured as a discharge transformer (3) for discharging the energy stored inductively in the series inductor ($W_1$), and wherein a reverse flow of energy through the series inductor is made possible by the discharge diode connected in series with the second winding discharging the energy in the series inductor.

2. The bidirectional DC/DC converter as claimed in claim 1, wherein the converter is a forward converter or a flyback converter having galvanic isolation and comprising a current-fed intermediate circuit.

3. The bidirectional DC/DC converter as claimed in claim 1, wherein the converter is configured as a single-phase or multiphase full-bridge phase-shifted (FBPS) converter, as a push-pull converter, or as a multilevel converter.

4. The bidirectional DC/DC converter as claimed in claim 1, in which the transformer (1), the electronic switches ($D_1$ to $D_4$, $M_1$ to $M_4$), and the control unit (2) are configured as a single-phase full-bridge phase-shifted (FBPS) DC/DC converter for hybrid and electric vehicles.

5. The bidirectional DC/DC converter as claimed in claim 1, wherein the second winding ($W_2$) of the discharge transformer (3) and the discharge diode (D) are biased in such a way that, if the discharge switch (S) is activated, the energy stored in the series inductor ($W_1$) is discharged into the low-voltage battery ($U_{NV}$).

6. The bidirectional DC/DC converter as claimed in claim 1, wherein the discharge transformer (3) is implemented using planar technology.

7. The bidirectional DC/DC converter as claimed in claim 1, comprising a damping capacitor ($C_{FB}$) connected in parallel, and connected in parallel with the low-voltage battery ($U_{NV}$).

8. The bidirectional DC/DC converter as claimed in claim 1, comprising a series circuit comprising a damping resistor ($R_S$) and a damping capacitor ($C_S$), which is connected in parallel with a series circuit comprising the series inductor ($W_1$) and the low-voltage battery ($U_{NV}$).

9. A method for charging the intermediate-circuit capacitor ($C_{ZK}$) which is arranged in the high-voltage network (HV) of a DC/DC converter including, terminals for a high-voltage battery ($U_{HV}$) and a low-voltage battery ($U_{NV}$), one or a plurality of transformers (1) for galvanically isolating the low-voltage network (LV) from the high-voltage network (HV), an intermediate-circuit capacitor ($C_{ZK}$) in the high-voltage network (HV), electronic switches ($D_1$ to $D_4$, $M_1$ to $M_4$) for connecting and reversing the polarity of the winding of the transformer (1) on the high-voltage network (HV) and on the low-voltage network (LV), a control device (2) for controlling the electronic switches ($D_1$ to $D_4$, $M_1$ to $M_4$); and a low-voltage side series inductor ($W_1$); and a second winding ($W_2$) connected in series with a discharge switch (S) and a discharge diode (D), and selectively connected to the low voltage network (LV) by the discharge switch (S), wherein the series inductor ($W_1$) and the second winding ($W_2$) are configured as a discharge transformer (3) for discharging the energy stored inductively in the series inductor ($W_1$), and wherein a reverse flow of energy through the series inductor is made possible by the discharge diode connected in series with the second winding discharging the energy in the series inductor, wherein the charging with energy from a low-voltage battery ($U_{NV}$) takes place via a sequence of controlled current pulses, and wherein in a first phase, the current pulses are separated from one another by dead times ($t_T$), and the current pulses become continuously longer and the dead times ($t_T$) become shorter, until the dead time of zero is reached, wherein in this phase, the electronic switches ($D_1$ to $D_4$) in the low-voltage network (NV) are open during the dead times ($t_T$), and as a result, the low-voltage battery ($U_{NV}$) is disconnected from the transformer (1), and wherein the discharge switch (S) is closed, whereby the series inductor discharges; and in a second phase, the current pulses are separated from one another by short-circuit periods ($t_K$), and the current pulses become continuously shorter and the short-circuit intervals ($t_K$) become longer, until the desired voltage is reached at the intermediate-circuit capacitor ($C_{ZK}$), wherein in this phase, the electronic switches ($D_1$ to $D_4$) in the low-voltage network (LV) are conductive during the short-circuit interval ($t_K$), and short-circuit the winding of the transformer (1), and wherein the discharge switch S is open and the voltage at the series inductor (W) continuously increases.

10. The method for charging the intermediate-circuit capacitor ($C_{ZK}$) in the high-voltage network of a DC/DC converter as claimed in claim 9, including the steps of:
    closing (11) the discharge switch (S);
    supplying (12) the low-voltage side of the transformer (1) with a sequence of alternating pulses of increasing width, wherein during the dead times ($t_T$) between the pulses, the electronic switches ($D_1$ to $D_4$) in the low-voltage network are open;
    determining (13) that the dead time ($t_T$) has reached zero;
    opening (14) the discharge switch (S);
    supplying (15) the low-voltage side of the transformer (1) with a sequence of alternating pulses, the width of which decreases, wherein during the short-circuit intervals ($t_K$) between the pulses, the low-voltage winding of the transformer (1) is short-circuited by the electronic switches ($D_1$ to $D_4$), and the low-voltage battery ($U_V$) supplies the series inductor ($W_1$); and
    ending (16) the charging operation when the intermediate-circuit capacitor ($C_{ZK}$) is charged to the desired voltage.

11. The method as claimed in claim 9, wherein the current pulses are delivered at a fixed frequency, in such a way that in the first phase, the sum of pulse length and dead time ($t_T$) is constant, and in the second phase, the sum of pulse length and short-circuit interval ($t_K$) is constant.

* * * * *